US010368714B2

(12) United States Patent
Muhammad

(10) Patent No.: US 10,368,714 B2
(45) Date of Patent: Aug. 6, 2019

(54) CLEANING APPARATUS HAVING AN AUDIO DEVICE

(71) Applicant: Karrima Muhammad, Glen Burnie, MD (US)

(72) Inventor: Karrima Muhammad, Glen Burnie, MD (US)

( * ) Notice: Subject to any disclaimer, the term of this patent is extended or adjusted under 35 U.S.C. 154(b) by 83 days.

(21) Appl. No.: 15/606,398

(22) Filed: May 26, 2017

(65) Prior Publication Data

US 2017/0340184 A1 Nov. 30, 2017

Related U.S. Application Data

(60) Provisional application No. 62/342,150, filed on May 26, 2016.

(51) Int. Cl.

| | |
|---|---|
| ***A47L 13/42*** | (2006.01) |
| ***G06F 3/16*** | (2006.01) |
| ***H04R 1/02*** | (2006.01) |
| ***A47L 13/16*** | (2006.01) |
| ***A47K 7/02*** | (2006.01) |
| ***F21L 4/02*** | (2006.01) |
| ***F21K 2/00*** | (2006.01) |

(Continued)

(52) U.S. Cl.

CPC ................ *A47L 13/42* (2013.01); *A47K 7/02* (2013.01); *A47L 13/16* (2013.01); *A47L 25/00* (2013.01); *F21V 33/0044* (2013.01); *H04R 1/028* (2013.01); *F21K 2/00* (2013.01); *F21L 4/02* (2013.01)

(58) Field of Classification Search

CPC . A47K 7/02; A47L 13/16; A47L 13/42; A47L 25/00; F21K 2/00; F21L 4/02; F21V 33/0044; G06F 3/165; H04R 1/028

See application file for complete search history.

(56) References Cited

U.S. PATENT DOCUMENTS

| | | | | | |
|---|---|---|---|---|---|
| 3,426,464 A | * | 2/1969 | Mezey | .................. | A47K 7/028 401/201 |
| 5,165,131 A | * | 11/1992 | Staar | ...................... | A46B 15/00 15/22.1 |

(Continued)

FOREIGN PATENT DOCUMENTS

| | | | | | |
|---|---|---|---|---|---|
| CN | 201518874 U | * | 7/2010 | | |
| GB | 2536563 A | * | 9/2016 | ............ | A47K 10/02 |
| WO | 1994017691 A2 | | 8/1994 | | |

OTHER PUBLICATIONS

CN 201518874 U—Jul. 2010—English Mashine Translation.*

*Primary Examiner* — Marc Carlson

(74) *Attorney, Agent, or Firm* — The Law Firm of Andrea Hence Evans, LLC

(57) ABSTRACT

A cleaning apparatus, such as a sponge, scrubber and cloth used for cleaning having an embedded waterproof audio device. An aspect of an embodiment of the present invention also contemplates the cleaning apparatus having a cleaning portion attached to a decorative portion, where a waterproof audio device may be located within the decorative portion. Power for the audio device may be provided by a rechargeable or non-rechargeable battery, which is internally positioned within the waterproof audio device. The cleaning portion and the decorative portion can glow in the dark, have lights, and may be made of a variety of materials, colors, shapes and sizes.

13 Claims, 7 Drawing Sheets

(51) Int. Cl.

| | |
|---|---|
| ***A47L 25/00*** | (2006.01) |
| ***F21V 33/00*** | (2006.01) |

(56) References Cited

U.S. PATENT DOCUMENTS

D405,925 S * 2/1999 Badillo .......................... D28/63
5,915,434 A * 6/1999 Juarez ...................... A47K 7/03 15/114
5,983,435 A * 11/1999 Osborne .................. A47K 7/02 15/209.1
6,029,303 A * 2/2000 Dewan ............... A46B 15/0002 15/105
6,161,246 A * 12/2000 Trachtenberg ........... A47K 7/02 15/209.1
D452,349 S * 12/2001 Badillo .......................... D28/63
D452,590 S * 12/2001 Badillo .......................... D28/63
D452,591 S * 12/2001 Badillo .......................... D28/63
6,629,799 B2 * 10/2003 Flores, Jr. ............ A47K 5/1202 15/104.92
D532,158 S * 11/2006 Zall ................................ D28/63
D532,554 S * 11/2006 Zall ................................ D28/63
D535,438 S * 1/2007 Zall ................................ D28/63
D535,439 S * 1/2007 Zall ................................ D28/63
D576,768 S * 9/2008 Schulte ........................ D21/599
D578,253 S * 10/2008 Schulte ........................ D21/600
D578,709 S * 10/2008 Schulte ........................ D21/599
8,128,303 B2 3/2012 LaFlamme et al.
9,521,898 B2 * 12/2016 Knight ................. A46B 11/066
2005/0231373 A1 10/2005 Lynn et al.
2005/0278882 A1 * 12/2005 Drzewiecki ........ A46B 15/0055 15/105
2007/0094822 A1 * 5/2007 Gatzerneyer ...... A46B 15/0002 15/105
2007/0192976 A1 * 8/2007 Gatzemeyer ........... A46B 5/021 15/105
2008/0307593 A1 * 12/2008 Lee .................... A46B 15/0002 15/105
2008/0307594 A1 * 12/2008 Gatzemeyer ........... A46B 5/021 15/105
2011/0146016 A1 * 6/2011 Gatzemeyer ......... A46B 13/023 15/167.1
2013/0212802 A1 * 8/2013 Hays .................... A63G 31/007 4/661
2014/0065588 A1 * 3/2014 Jacobson ............. G09B 23/283 434/263
2016/0088927 A1 * 3/2016 Knight ................. A46B 11/066 15/4
2016/0143718 A1 * 5/2016 Serval ................ A46B 15/0022 15/22.1
2017/0086605 A1 * 3/2017 Wolfe .................... A47G 9/062
2017/0113016 A1 * 4/2017 Monros ................. A61M 21/02
2017/0326464 A1 * 11/2017 Osarogiagbon ........ A47G 33/00

* cited by examiner

CLEANING APPARATUS HAVING AN AUDIO DEVICE

CROSS-REFERENCE TO RELATED APPLICATIONS

This Application claims the benefit of, and is related to, the following Applicant's provisional patent application: U.S. Provisional Patent Application No. 62/342,150 entitled "CLEANING APPARATUS HAVING AN AUDIO DEVICE" filed May 26, 2016, which is incorporated herein in its entirety.

FIELD OF THE INVENTION

This invention relates to cleaning apparatuses such as, without limitation, sponges, scrubbers and clothes. More specifically, the invention relates to a cleaning apparatus having an audio device embedded within the body of the cleaning apparatus or within the decorative features of the cleaning apparatus.

BACKGROUND OF THE INVENTION

There is a plethora of cleaning apparatuses such as, without limitation, sponges, scrubbers and cloth material which may be used for cleaning the body, surface, articles and/or objects. Common cleaning devices are a cloth, a meshed material sponge or scrubber, loofa, natural sponge or cellulose sponge. They do the job of cleaning but they do not have audio functionality to give verbal instruction or play music for the user. The present invention seeks to add audio functionality to cleaning apparatuses by incorporating a waterproof audio device within the cleaning apparatus.

SUMMARY OF THE INVENTION

An aspect of an embodiment of the present invention contemplates a cleaning apparatus which may have cleaning and decorative portions where the decorative portion has a waterproof audio device embedded within it, which, when activated, plays an audible audio file. In an aspect of an embodiment of the present invention, the audio device may be configured to play a song and/or may provide cleaning instructions to a user such as bathing child as to what to clean and in what order.

In an aspect of an embodiment of the present invention, the invention may be configured for utilization while cleaning the body. The same or a similar configuration of the present invention could be used to clean any surface or article. Power to the audio device of the cleaning apparatus, may be provided to the unit by a battery housed inside the waterproof audio device. On and off control of the audio functionality may be enabled by use of a button connected with the audio device and located on the exterior of the cleaning apparatus. In another aspect of an embodiment of the present invention, the on and off control may be located on a decorative element of the decorative portion of the cleaning apparatus.

In an aspect of an embodiment of the present invention, the audio device may be wireless communication enabled by way of a transceiver component of the audio device. In one aspect, the audio device may be Bluetooth enabled in which case the embedded audio device of the cleaning apparatus may be controlled by another Bluetooth enabled or wireless device.

In an aspect of an embodiment of the present invention, the cleaning device may contain small waterproof lights that flash in addition to the activation of the audio device. The lights are visible on the body of the cleaning apparatus and/or the attached decorative portion of the cleaning apparatus.

In an aspect of an embodiment of the present invention, the exterior body of the cleaning apparatus and/or the attached decorative details of the cleaning apparatus may glow in the dark. This may be made possible, in one aspect of an embodiment of the present invention, by use of fluorescent and/or luminescent materials.

In an aspect of an embodiment of the present invention, the audio device may have recording and play back functionality that may be controlled by push buttons located on the body of the audio device and indicated on the exterior of the cleaning apparatus or attached decorative portion of the cleaning apparatus.

Additional aspects, objectives, features and advantages of the present invention will become apparent from the following description of the preferred embodiments with reference to the attached drawings.

DETAILED DESCRIPTION OF THE INVENTION

Figure 1A:
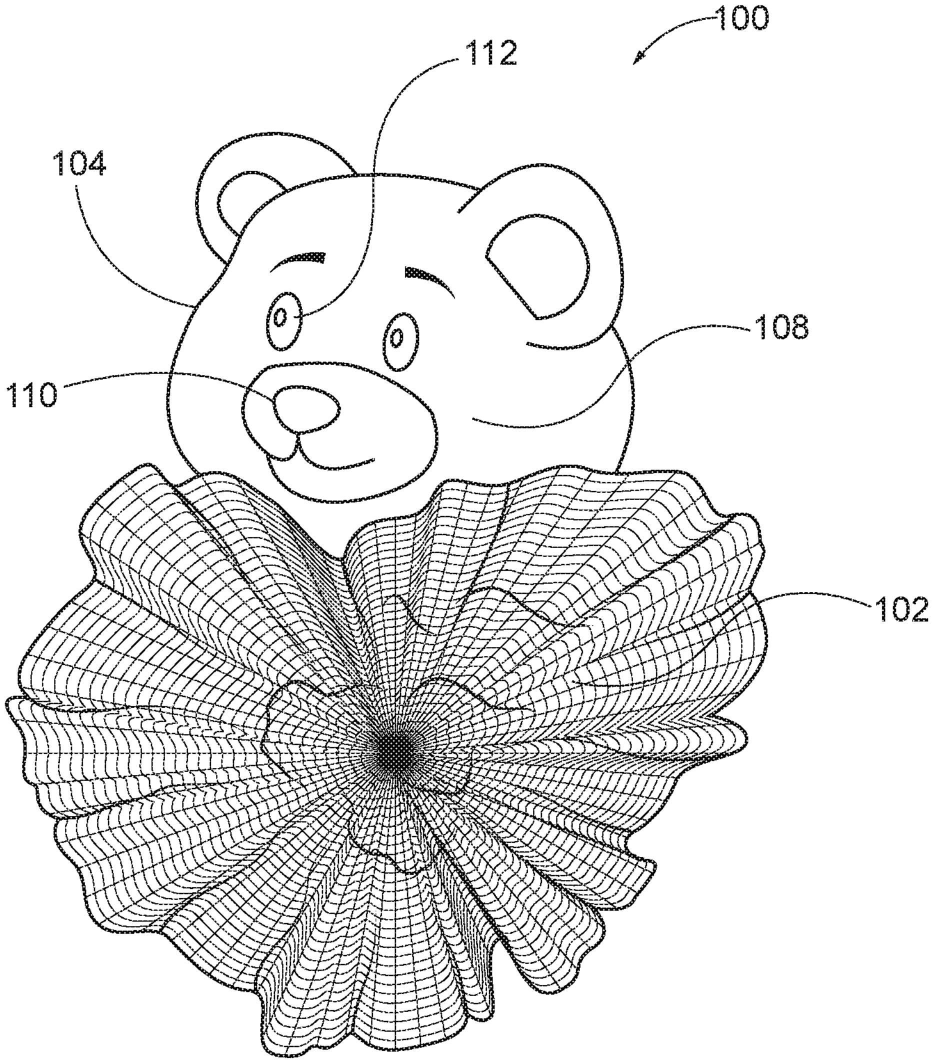
FIG. 1A illustrates a front view of the cleaning apparatus having an embedded audio device according to an aspect of an embodiment of the present invention.

Referring now to FIG. 1A a front view of cleaning apparatus 100 having a cleaning portion 102 and a decorative portion 104 having a decorative element or design 106 is shown according to an aspect of an embodiment of the present invention.

Cleaning apparatus 100, in one aspect of an embodiment of the present invention, may include a cleaning portion 102 which may be any one of, without limitation: a sponge, cloth, scrubber. Cleaning apparatus 100 may also include decorative portion 104 attached to cleaning portion 102 where decorative portion 104 may house waterproof audio device 108. Waterproof audio device 108 may, in one aspect of an embodiment of the present invention, include electronic components, a processor, memory, a wireless communication component (such as, without limitation, a transceiver and/or receiver), a speaker and a battery. In an aspect of an embodiment of the present invention, the processor and memory of audio device 108 may enable play and recording of audio such as a song or a recording of instructions for the user. Waterproof audio device 108 may be secured within decorative portion 104.

Here, for exemplary purposes only, decorative design 104 is represented by a bear. In aspect(s) of embodiment(s) of the present invention, an on/off pushbutton 110 may be fashioned to look like a part of the design (i.e. the bear, in this case, the bear's nose. In this instance, pushbutton 110 is connected with audio device 108 and serves as its exterior control. Pushing on nose (i.e. on/off push button 110) would turn on audio device 108. Aspect(s) of embodiment(s) of the present invention contemplate locating this component on decorative portion 104 or cleaning portion 102, depending on the location of audio device 108 and the shape and model of decorative portion 104 and the type, shape and size of cleaning portion 102. In an aspect of an embodiment of the present invention, audio device 108 may also include a volume control 112 for adjusting the volume of the device's audio output. In an aspect of an embodiment of the present invention, volume control button 112 may be located on or within any part of decorative portion 104 such as, without limitation, the bear's eyeballs 112.

Figure 1B:
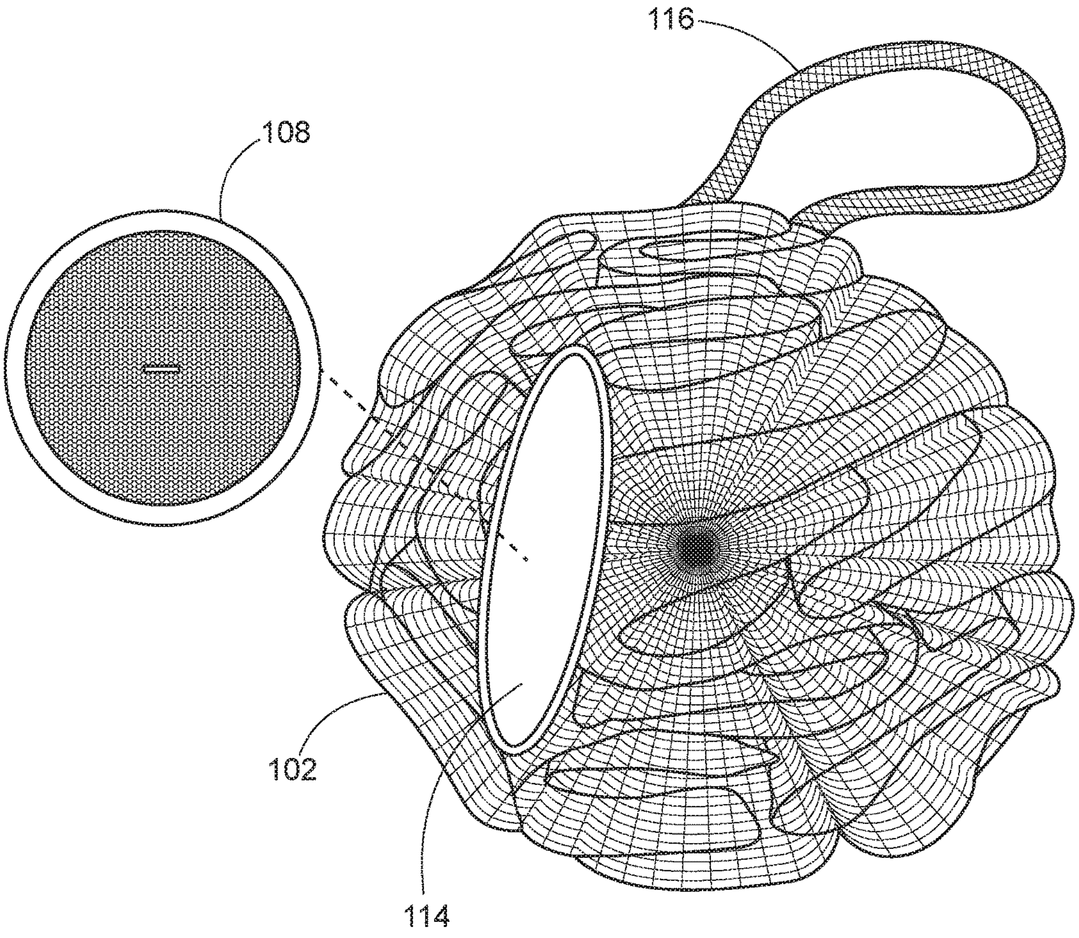
FIG. 1B illustrates a side view of the removable embedded audio device of the cleaning apparatus according to an aspect of an embodiment of the present invention.

Referring now to FIG. 1B a side view of audio device 108 of cleaning apparatus 100 is shown according to an aspect of an embodiment of the present invention. Here, cleaning apparatus 100, in an aspect of an embodiment of the present invention, only has cleaning portion 102 (and is thus without decorative portion 104). In one aspect of an embodiment of the present invention, audio device 108 may be located within sealable pocket 114 of cleaning portion 102. In another aspect, audio device 108 may be removable and may also be Bluetooth-enabled.

Aspect(s) of embodiment(s) of the present invention contemplate including decorative portion 104 which may house audio device 108 or a hard case decorative portion 104 that may permanently house audio device 108. In the soft variety of designs, a sealable audio device pocket 114 may be included to house audio device 108. In an aspect of an embodiment of the present invention, audio device 108 may be powered by a battery, which in one aspect, may be rechargeable.

An aspect of an embodiment of the present invention may include rope handle 116. This element may or may not be included in any embodiment. Also for any embodiment the invention includes the option of lighting elements (not shown) on decorative portion 104 or cleaning portion 102. Cleaning portion 102 may be made from a variety of materials including, without limitation, cloth, meshed material sponge or scrubber, a loofa, a natural sponge or a cellulose sponge. The body of decorative portion 104 could be a variety of colors, materials, shapes and sizes. Additionally, the material of decorative portion 104 may glow in the dark. Decorative portion 104 can be a soft stuffed character, a flat decorative cloth, or a hard casing in a variety of shapes, sizes and colors.

Referring now to FIGS. 2A through 2D, different views along with internal components of decorative portion 202 are shown without the cleaning portion of cleaning apparatus 200 according to aspects of embodiments of the present invention. Decorative portion 202 may include first shell half 202A upon which decorative element 204 may be engraved or positioned. Decorative element 204 may be any kind of depiction including, without limitation, a smiling face, an animal's face etc. First shell half 202A may also, on its face, include audio holes 206 for transmitting the audio from within decorative portion 202.

Figure 2A:
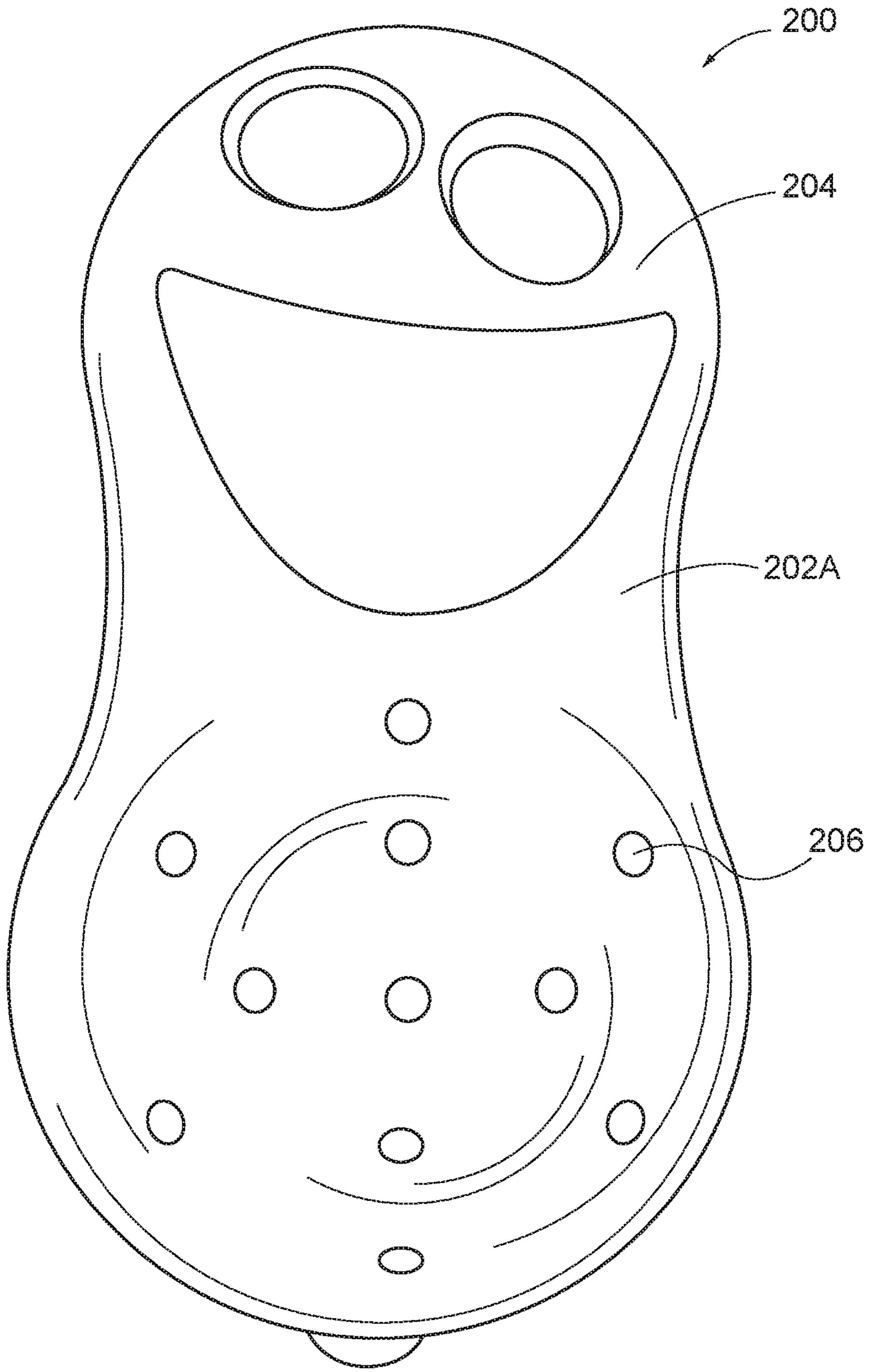
FIG. 2A illustrates a front view of another design of the cleaning apparatus' decorative portion according to an aspect of an embodiment of the present invention.
Figure 2B:
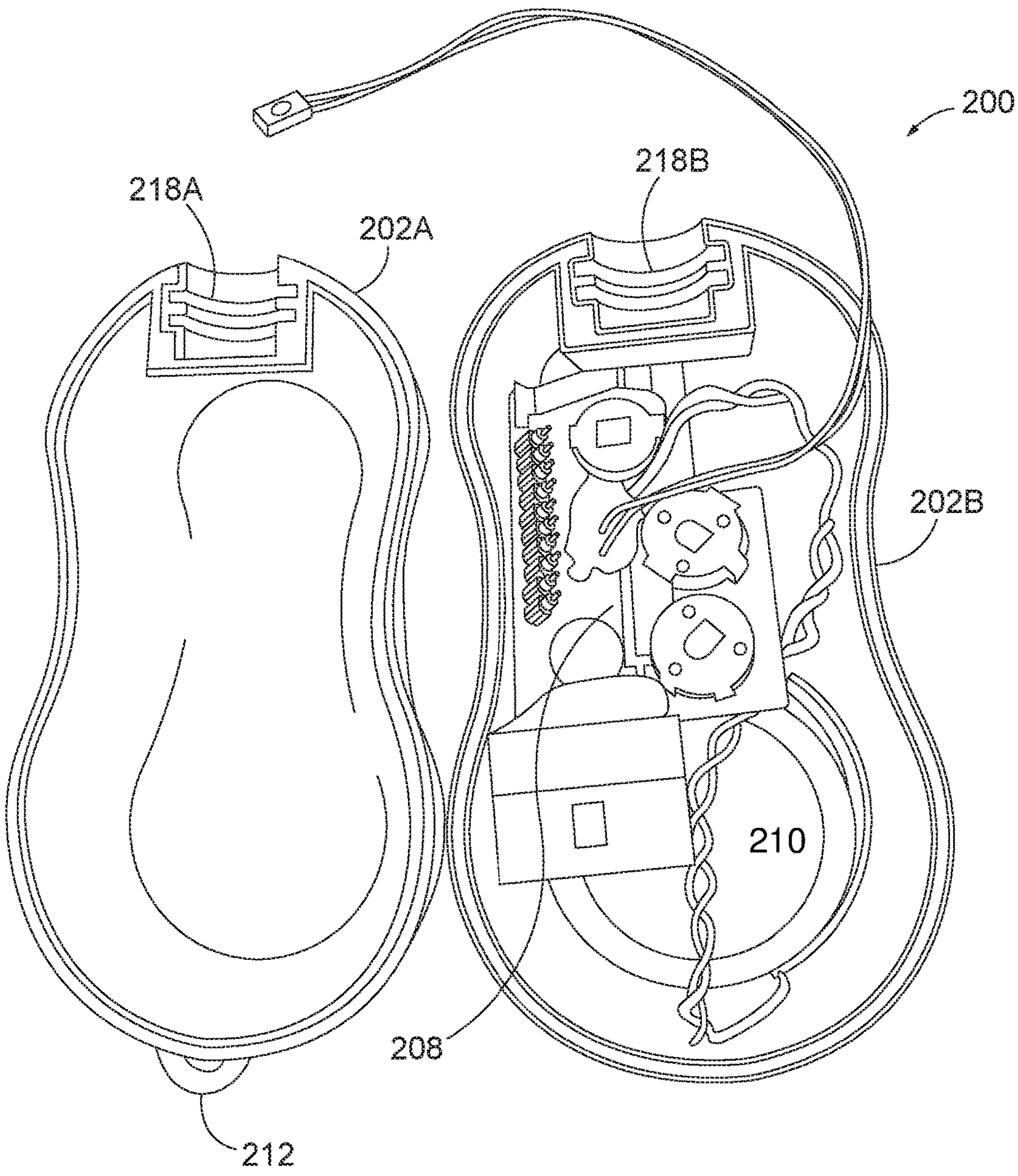
FIG. 2B illustrates the internal components of the cleaning apparatus' decorative portion according to an aspect of an embodiment of the present invention.

Referring specifically to FIG. 2B, second shell half 202B and the internal components of decorative portion 202 are illustrated according to an aspect of an embodiment of the present invention. Second shell half 202B mates with first shell half 202A to seal the internal components of decorative portion 202. As shown, internal components of decorative portion 202 may include, electronic circuit 208 connected to speaker 210. Electronic circuit 208, in one aspect, may be housed within a cloth, a meshed material sponge or scrubber, loofa, natural sponge or cellulose sponge include a processor, code, memory, a wireless transceiver and/or receiver, a speaker and a battery. In an aspect of an embodiment of the present invention, the processor and memory may enable play and recording of audio such as a song or a recording of instructions for the user. In addition, the memory of electronic circuit 208 may be used for storing music which may be played by cleaning apparatus 200.

Figure 2C:
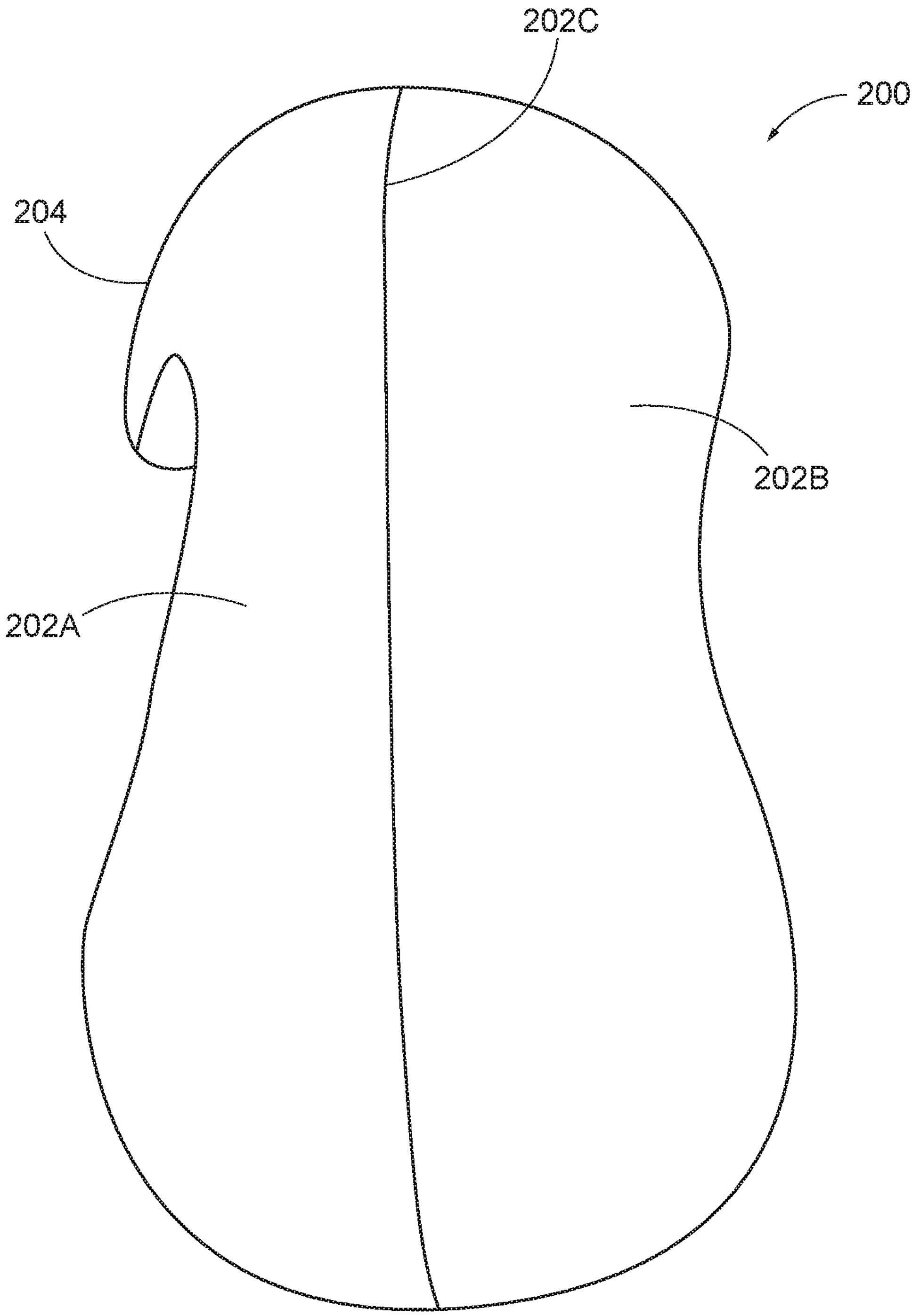
FIG. 2C illustrates a side view of the cleaning apparatus' decorative portion according to an aspect of an embodiment of the present invention.
Figure 2D:
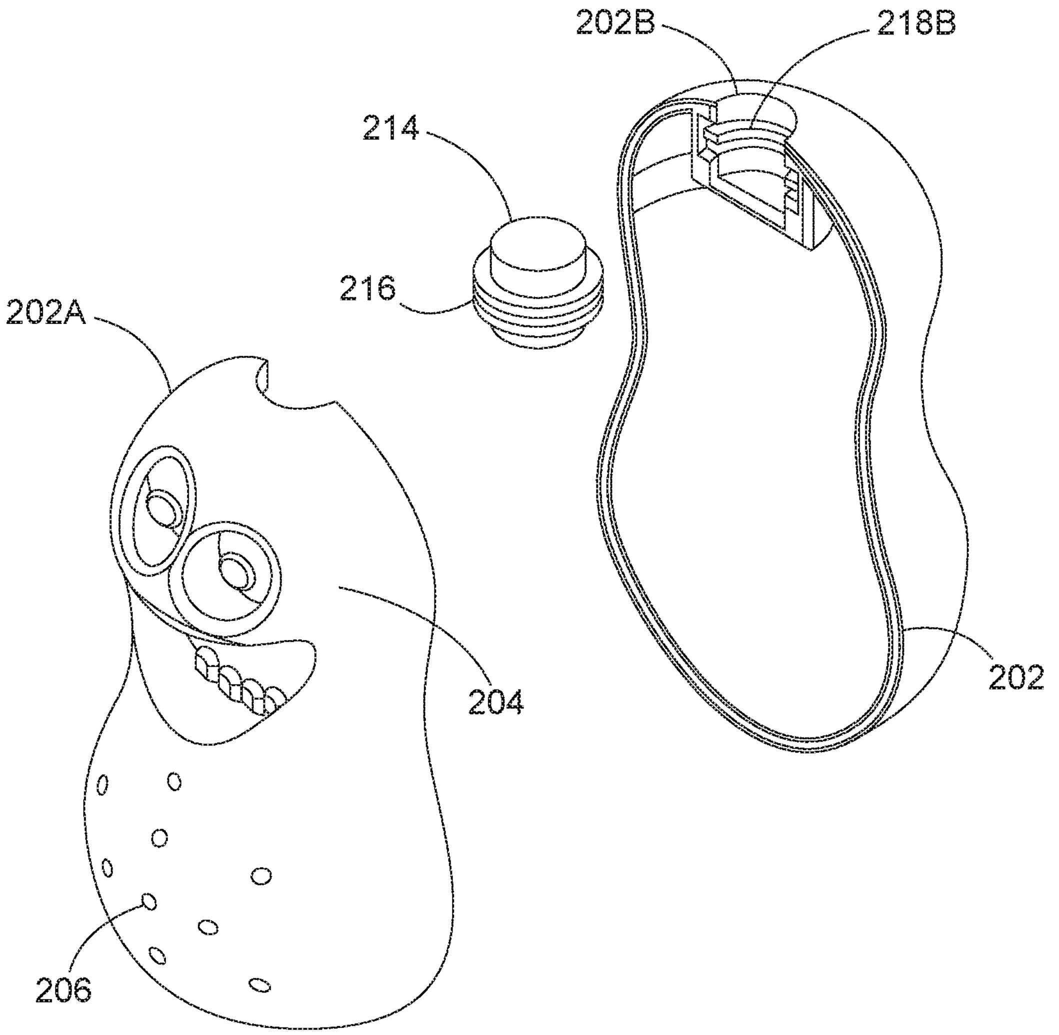
FIG. 2D illustrates the cleaning apparatus' decorative portion along with a control button according to an aspect of an embodiment of the present invention.

At the base of first shell half 202A is attachment component 212 for attaching decorative portion 202 with cleaning portion 102 (not shown). As seen in FIG. 2C, first shell half 202A and second shell half 202B mate to enclose the internal components of decorative portion 202 with a water seal 202C. Water seal 202C protects the internal components of decorative portion 202.

Electronic circuit 208 may be controlled using button 214 (FIG. 2C) for turning on or off the audio emanating from electronic circuit 208. Button 214 may, in one aspect of an embodiment of the present invention, may be screwed or snapped in place using its set of grooves 216 which connect with correspondingly fitting sets of grooves 218A and 218B found on shell halves 202A and 202B, respectively.

In an aspect of an embodiment of the present invention, cleaning apparatus 100 may include lighting elements (not shown) positioned on either or both of cleaning portion 102 or decorative portion 104. The lighting elements may be connected and powered by the same power source that powers audio device 108.

Figures 3A, 3B, 3C:
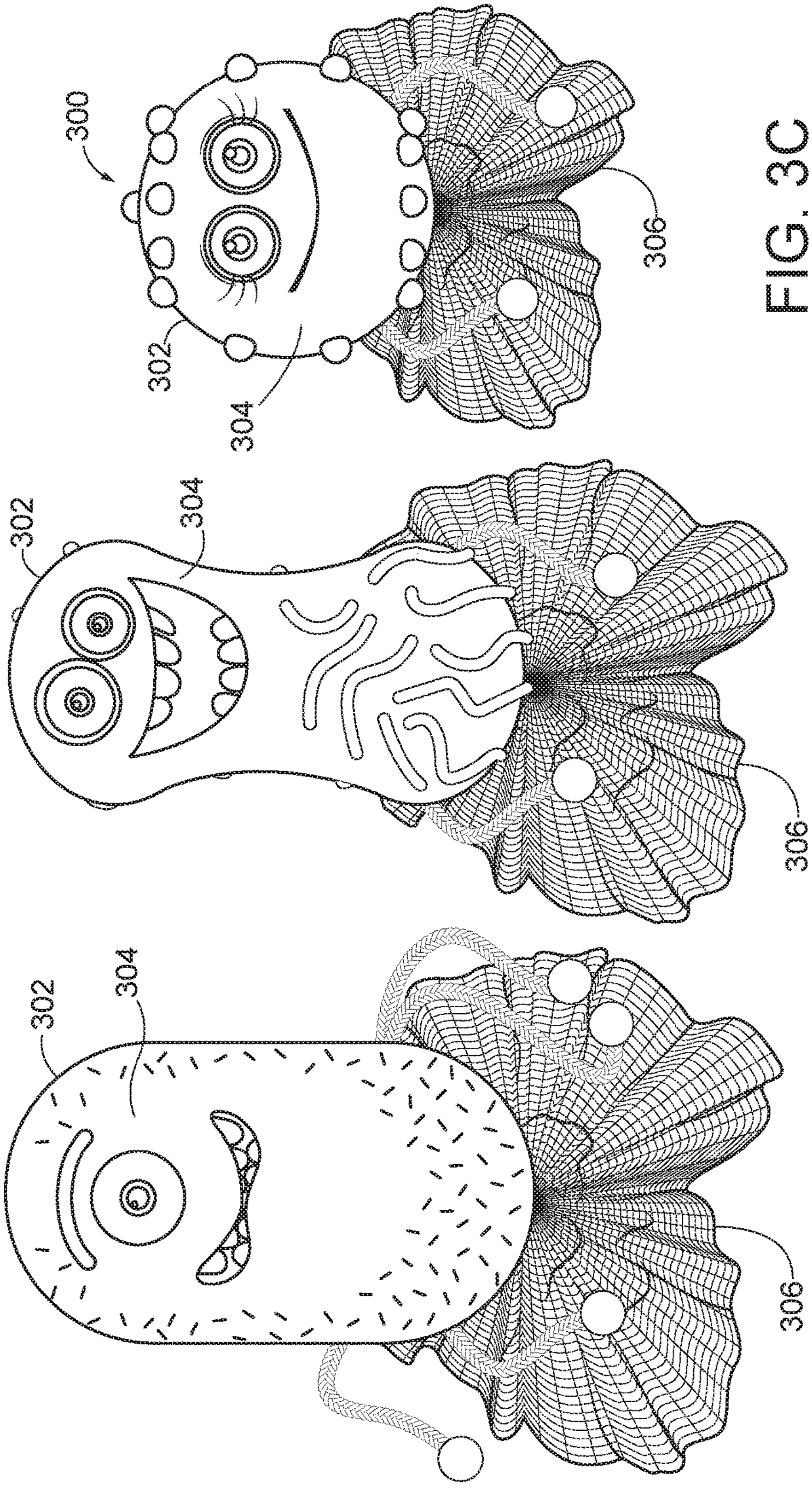
FIGS. 3A-3C illustrate different designs for the decorative element of the cleaning apparatus' decorative portion according to aspects of embodiments of the present invention.

Referring now to FIGS. 3A-3C, different designs 304 for decorative portion 202 of cleaning apparatus 300 are shown according to aspects of embodiments of the present invention. Cleaning apparatus 300 is shown with different designs 304 on decorative portion 302 being connected with cleaning portion 306 at the base of decorative portion 302.

The invention has been described in detail with particular reference to certain preferred embodiments thereof, but it will be understood that variations and modifications can be effected within the spirit and scope of the invention.

What is claimed is:

1. A cleaning apparatus comprising of:

a cleaning portion, wherein the cleaning portion comprises any one of: a meshed material sponge, a meshed material scrubber, a loofa, a natural sponge or a cellulose sponge;

a decorative portion comprising a non-rigid material, attached to the cleaning portion, wherein the decorative portion comprises any one of: a decorative toy, an animal figurine, a figurine, or a light-emitting toy, and an internally positioned audio device embedded within the decorative portion.

2. The cleaning apparatus of claim 1, wherein the audio device comprises of electronic components, a processor, memory, a wireless communication component and a speaker.

3. The cleaning apparatus of claim 2, wherein the wireless communication component enables communication with another wireless device and control of the cleaning apparatus by the wireless device.

4. The cleaning apparatus of claim 2, wherein the apparatus is enabled to record and playback sounds by way of the processor and/or memory.

5. The cleaning apparatus of claim 1 wherein the audio device comprises of an on/off button and a volume control button, both connected to the audio device, wherein each is accessible from the surface of the decorative portion.

6. The cleaning apparatus of claim 1, wherein the audio device may be removably located within the decorative portion.

7. The cleaning apparatus of claim 1, wherein the audio device may be permanently affixed within the decorative portion.

8. The cleaning apparatus of claim 1, wherein the audio device may be powered by a battery located within the decorative portion, wherein the battery may be any one of: non-rechargeable or rechargeable.

9. The cleaning apparatus of claim 1, further comprising of a rope handle.

10. The cleaning apparatus of claim 1, further comprising of lighting elements on any one or more of: the cleaning portion or the decorative portion.

11. A cleaning apparatus, comprising:

a cleaning component, wherein the cleaning component is any one of: a meshed material sponge, a meshed material scrubber, a loofa, a natural sponge or a cellulose sponge;

a decorative component, attached to the cleaning component, wherein the decorative component is any one of: a decorative toy, an animal, a figurine, or a light-emitting toy;

a sealable pocket positioned within the cleaning component; and an audio device positioned within the sealable pocket.

12. The cleaning apparatus of claim 11, wherein the audio device comprises of electronic components, a processor, memory, a wireless communication component and a speaker.

13. The cleaning apparatus of claim 12, wherein the apparatus is enabled to record and playback sounds by way of the processor and/or memory.

* * * * *